United States Patent [19]

Yarwood et al.

[11] 4,075,303
[45] * Feb. 21, 1978

[54] METHOD OF PREPARATION OF CERAMIC FOAM

[75] Inventors: John C. Yarwood, Madison, Conn.; James E. Dore, Ballwin, Mo.; Robert K. Preuss, Middletown, Conn.

[73] Assignee: Swiss Aluminium Ltd., Chippis, Switzerland

[*] Notice: The portion of the term of this patent subsequent to May 17, 1994, has been disclaimed.

[21] Appl. No.: 770,395

[22] Filed: Feb. 22, 1977

Related U.S. Application Data

[63] Continuation-in-part of Ser. No. 589,294, June 23, 1975, which is a continuation-in-part of Ser. No. 563,213, March 28, 1975, Pat. No. 3,962,081.

[51] Int. Cl.² .............................................. B29H 7/20
[52] U.S. Cl. .......................................... 264/44; 264/43
[58] Field of Search ............................ 264/44, 43, 344

[56] References Cited

U.S. PATENT DOCUMENTS 4,024,212  5/1977  Dore et al. ............................ 264/44

Primary Examiner—Donald J. Arnold
Assistant Examiner—John A. Parrish
Attorney, Agent, or Firm—Gregory P. LaPointe; Robert H. Bachman; Robert A. Dawson

[57] ABSTRACT

Ceramic foams possessing controlled permeability and uniformity are prepared by a combined rolling operation of impregnating an open-celled organic polymer foam material possessing a predetermined permeability and resilience with a fluid aqueous slurry of a thixotropic ceramic composition and immediate passage through at least two controlled roll gaps, wherein the rolls are preset to effect a temporary compression ranging from about 50 to 90% for the first pass and 70 to 90% for the second pass. The resulting material is thereby uniformly impregnated with the required amount of slurry, and is then dried and heated to remove the organic foam component. The foams prepared in accordance with the present invention are useful as filters for molten metals, especially aluminum and its alloys.

20 Claims, 2 Drawing Figures

METHOD OF PREPARATION OF CERAMIC FOAM

CROSS REFERENCE TO RELATED APPLICATION

This application is a Continuation-In-Part of Ser. No. 589,294, filed June 23, 1975, by the inventors herein, which is a Continuation-In-Part of Ser. No. 563,213, filed Mar. 28, 1975, now U.S. Pat. No. 3,962,081, issued June 8, 1976.

BACKGROUND OF THE INVENTION

The present invention relates generally to ceramic foams which are highly advantageous for the filtration of molten metals such as molten aluminum, and particularly to efficient and economical methods for their preparation.

Porous ceramic foams obtained by treating impregnated open-celled organic sponges or foams have been disclosed in the prior art, as represented by U.S. Pat. No. 3,090,094 to Schwartzwalder et al., U.S. Pat. No. 3,097,930 to Holland, and U.S. Pat. No. 3,111,396 to Ball. Furthermore, the use of such ceramic foams as filters for molten metal, and particularly for the filtration of molten aluminum and copper, has been disclosed in U.S. Pat. No. 3,893,917 issued July 8, 1975 for "Molten Metal Filter" and in U.S. Pat. 3,947,363 issued Mar. 10, 1976, by Michael J. Pryor et al.

As noted above, the prior art suggests the preparation of ceramic foam materials. Thus, U.S. Pat. No. 3,111,396 to Ball suggests that an organic polymer foam after immersion into a suspension of refractory material may subsequently be compressed by passage through rolls to effect the removal of excess refractory. This technique, which is comparable to a wide variety of conventional expulsion techniques used in the art suffers from an inherent disadvantage in that the slurry is not uniformly distributed through the body of the article. Thus, the outer area of the article tends to be more thinly coated with slurry than that near the center line. Such defects are particularly evident at the extremes of the permeability range found suitable for use in the preparation of filters for molten metal; thus, bodies of high permeability tend to have undesirably weak surfaces and edges, while bodies of relatively low permeability tend to exhibit undesirable center line blockage. Such defects render the resulting foams unsuitable for use in the filtration of molten metal.

The above difficulties were overcome by the process disclosed in our prior application Ser. No. 589,294, filed June 23, 1975, referred to above and the disclosure of which is incorporated herein by reference. This required an initial step of impregnation of the polymer foam with the slurry of ceramic composition, wherein the foam was subjected to repeated compression and recovery while completely immersed in the vigorously stirred or vibrated slurry. The impregnated foam was then removed from the impregnating tank and treated to remove excess slurry by passing it through two sets of rolls to effect twice-repeated compression and recovery, the roll gaps being preset to accomplish first a compression of 50-90% and then a compression of 70-90%. However, such process was disadvantageous in requiring an excessive amount of handling of the polymeric foam slabs, which could deleteriously affect the distribution of the contained slurry and also the strength properties of the completed ceramic foam body. Also, the procedural steps could not readily be automated or be adapted for use in a continuous or semi-continuous mass production line.

Accordingly, it is a principal object of the present invention to provide an efficient and economical method for the preparation of ceramic foam articles having predetermined permeability properties, wherein the operations of impregnation of polymeric foam with a slurry of ceramic composition and the removal therefrom of excess slurry are combined.

It is a further object of the present invention to provide an efficient and economical method as aforesaid which yields products possessing improved strength properties.

It is yet a further object of the present invention to provide a readily automated method for the production of ceramic foam articles as aforesaid which exhibit structural uniformity and freedom from defects such as center line blockage and outer surface weakness.

It is a still further object of the present invention to provide a method as aforesaid, which lends itself to rapid commercial-scale production techniques through the provision of a unitary operation wherein the steps of slurry impregnation and of excess slurry removal are effected in rapid succession.

Other objects and advantages will be apparent from a careful review of the ensuring description.

SUMMARY OF THE INVENTION

In accordance with the present invention, ceramic foam articles of controlled permeability and structural uniformity are prepared by a process comprising providing an open-celled organic polymer foam material possessing a predetermined permeability and resilience, and in a unitary operation in which the steps are effected in rapid succession, impregnating said polymer foam material with an aqueous slurry of a thixotropic ceramic composition which is maintained fluid to facilitate impregnation, and expelling excess slurry from said foam material by conducting at least two passes of said material through preset rolls to effect a temporary compression of about 50 to 90% for the first pass and 70 to 90% for the second pass. The resulting uniformly impregnated foam structure is then dried to volatilize moisture and heated to remove the organic foam component. The resulting ceramic foam article is ready for use or may be further heated to sinter the ceramic material.

DETAILED DESCRIPTION

Figure 1:
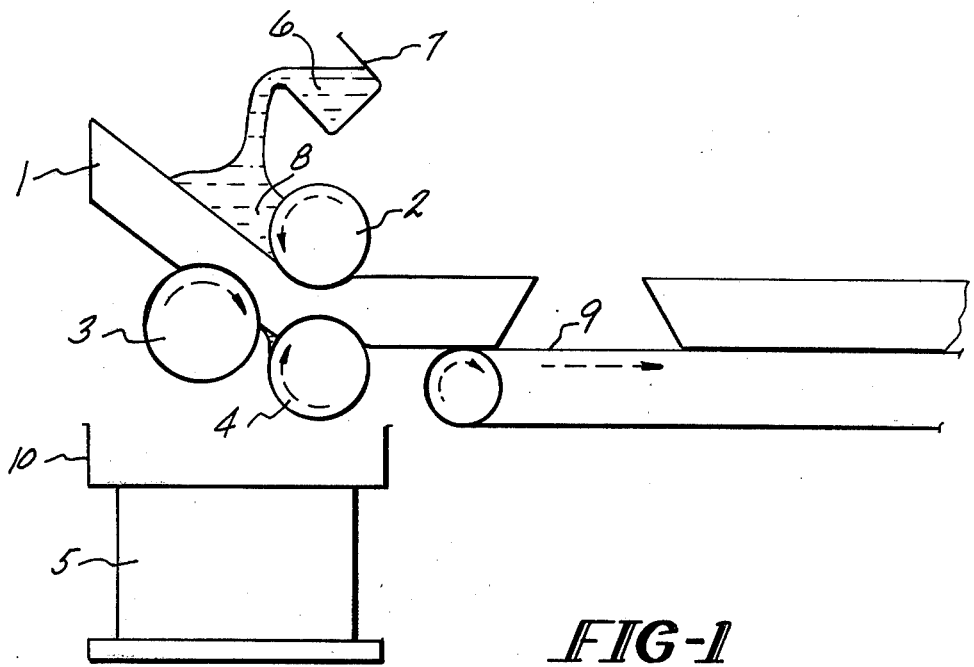
FIG. 1 shows a preferred embodiment of the invention in schematic form, representing the production in a rolling operation of a uniformly impregnated polymeric foam sheet or slab by the application thereto of an aqueous suspension of ceramic composition just prior to passage through a triple roll assembly, by which the impregnated sheet is, in rapid succession, compressed, allowed to recover, and again compressed before recovery.

In accordance with the present invention, the foregoing objects and advantages are readily obtained.

Ceramic foams possessing controlled permeability and structural uniformity are prepared by a process comprising providing an open-celled organic polymer foam material possessing a predetermined permeability and resilience, impregnating said polymer material with a fluid aqueous slurry of a thixotropic ceramic composition flowed thereon just prior to passage through a pair of roll gaps, preset to effect temporary successive compressions, amounting to about 50 to 90% of the thickness of said material for the first pass, and 70 to 90% of said thickness for the second pass. Following the combined impregnation and compression steps, the resulting uniformly impregnated foam material is heated to remove moisture and then the organic foam component. The resulting article is then ready for use, or may, if desired, be further heated to sinter the ceramic material.

The preparation of the ceramic foam articles of the present invention is dependent upon the observance of certain critical properties and parameters, as described in our U.S. Pat. No. 3,962,081, the disclosure of which is incorporated herein by reference. Thus, the provision of the open-celled organic polymer foam material must be made with a view to control of the permeability and resilience of the final ceramic article, which may advantageously possess an air permeability in the range of 400 to 8,000 $\times$ 10$^{-7}$ cm$^2$ for use as filters for molten aluminum. The determination of air permeability is derived from the text *Micromeretics* by J. M. Dallavalle, published by Pitman, 1948, at page 263. In accordance with the present invention, the air permeability of the resulting ceramic articles has been found to depend upon the permeability of the organic polymer foam employed in its preparation. For example, ceramic foams having permeabilities in the range of from about 800 to about 2,200 $\times$ 10$^{-7}$ cm$^2$ have been prepared from polyurethane foam materials having air permeabilities ranging from 4,500 to 5,400 $\times$ 10$^{-7}$ cm$^2$. Further, the selection of raw foam permeability in the range of $-2$% facilitates the preparation of a ceramic foam having a permeability predetermined to within a range of $-5$%.

In addition to the control of permeability, the foams of the present invention must possess structural uniformity and a particular range of cell size. Structural uniformity has been found to relate to the resilience of the organic polymer foam precursor. Particularly, resilience may be determined with reference to certain standards set forth in the ASTM-D-1564-71 which refers to the properties of compression set and resilience as measured by ball rebound. Compression set, determined by the compression load deflection test, measures the extent to which the foam returns to its original size or thickness after compression to a stated reduction such as, for example, 50%. Foams found suitable in accordance with the invention exhibit a compression set of less than 30% at 50% compression, and thus, return to at least 70% of their original thickness after compression is released. Resilience, determined by the ball rebound test, measures the resistance that the material exhibits to compression by the height of rebound of a steel ball dropped from a stated distance onto a foam sample. The percentage of return of the ball to the original height is noted, and foams suitable in the present invention have been found to be those possessing ball rebounds of greater than 25%.

The above properties, usually measured in tests run under dry conditions, must be substantially retained in an aqueous environment as, for example, during impregnation with and uniform distribution of the aqueous ceramic slurry in accordance with the present invention. Accordingly, it has been found that hydrophobic foams perform better and are preferred to hydrophilic foams, as the latter suffer considerable loss of resilience is evident in the occurence of the aforenoted defect of center line blockage.

With the above-noted criteria in mind, organic polymer foam materials which may be employed in the present invention include a wide variety of highly resilient, reticulated hydrophobic materials such as the polyester and polyether polyurethanes, such as "high resilience" or "cold cure" urethane materials which utilize polymeric isocyanates in their formulation; polyvinyl foams such as polyvinyl chloride, polyvinyl acetate, and polyvinyl copolymers; polyurethanes coated with polyethylene or polysiloxane polymers and copolymers; and foams prepared from suitable resins such as cellulosic derivatives. The foams must burn out or volatilize at below the firing temperature of the ceramic material with which they are impregnated. As noted earlier, the dimensions of the foam should correspond roughly to the dimensions of the desired ceramic article. Thus, for example, a foam material having a thickness ranging from about ½ to 4 inches is employed when the resulting ceramic foam is to function as molten metal filter.

In addition to the properties of permeability and uniformity, the above noted polymeric materials must possess a pore size within defined limits in order to render them effective in the preparation of molten metal filters. Pore or cell size has been found to be important to the structural uniformity of the ceramic foam and should preferably lie within the range of 5 ppi (pores per linear inch) and 50 ppi.

The control of the above noted variables contributes to the structural uniformity and permeability of the resulting filter and directly affects metal flow rate and effectiveness through the tortuosity of the flow path. Though these factors are significant, additional factors will be discussed hereinbelow which combine to provide further control of the final ceramic foam article.

The organic foam selected with reference to the above discussion is then impregnated with a slurry of a thixotropic ceramic material. The property of thixotropy is important to the present invention as it affects the uniformity of structure and strength of the final ceramic foam article. Thixotropic materials are those which display a high resistance to flow under low rates of shear and correspondingly, a low resistance to flow under relatively high rates of shear. As this relates to the method of the present invention, the ceramic slurry must have sufficient fluidity during conditions of flow to enter and fill the voids of the organic foam material rapidly and thereby coat the surrounding polymer web, and at the same time be capable of quickly regaining sufficient viscosity under stagnant conditions to resist running out or draining from the foam once impregnation is complete. It has been found in accordance with the present invention that certain ceramic materials prepared in combination with particular air setting agents and temporary binders display the desired thixotropic character to successfully conduct impregnation and the subsequent uniform distribution throughout the polymeric foam.

As the ceramic slurry which is employed herein may vary according to the end use of the foam, a wide variety of ceramic materials of varying refractoriness may be employed. Particularly, such materials as alumina, chromia, zirconia, magnesia, titania, silica and mixtures thereof may be present. Such materials are noted for their relatively high refractoriness or ability to serve in high temperature situations. However, other materials of lesser refractoriness such as mullite, calcined clay and various glasses of high softening temperature may be employed herein either alone or in combination with each other and with more refractory materials to prepare the resulting foam article. Insofar as the utility of the resulting article as a molten filter is concerned, the only requirement placed on a selection of the particular ceramic materials is that they provide the article with sufficient resistance to the chemical attack of the molten alloys over the exposure times involved in filtration. A particular composition which has been successfully employed herein comprises a mixture of alumina and chromia.

The above composition also includes a room temperature binder or air setting agent which provides green strength to the slurry, particularly during the bake out and the optional sintering operations where the foam is subjected to thermal stress. A wide variety of air setting or binder agents are known in the art which would be suitable in this regard. Thus, for example, the composition of the present invention may employ such materials as colloidal aluminum orthophosphate, alkali metal silicates such as sodium and potassium silicate, ethyl silicate, aluminum hydroxychloride, magnesium orthoborate, and the like. The binder or air setting agent is generally employed in a 50% aqueous solution which may be employed in the range of from 5 to about 50% of the total slurry. Preferably, the binder solution is employed in a range of from 25 to 35% of the slurry.

In addition to the binder noted above, certain agents herein referred to as rheological agents are employed which serve to promote the desired thixotropic property of the slurry. Several materials are known which may serve as rheological agents, among them certain organic materials such as carboxymethyl cellulose and hydroxyethyl cellulose, and certain inorganic materials such as bentonite and kaolin. Of the materials available in this regard, bentonite has been found to be particularly preferred. Bentonite is a naturally occurring clay composed primarily of aluminum and various silicates, usually including quantities of magnesium and iron. In addition to its promotion of the thixotropic properties of the slurry, bentonite performs a small setting or binding function, as certain glassy phases are produced upon firing of the article which yield increased strength in the final foam structure. In addition to bentonite, a small amount of kaolin may also be employed which provides both binding and rheological improvement to the final slurry in the same manner as bentonite. Kaolin is a clay composed primarily of alumina and silica. Naturally, one could employ the chemical equivalents of the aforenoted materials to approximate their compositions. The general range of addition of the rheological agents of the present invention is within about 0.1 to about 12% by weight of the slurry. In a preferred embodiment, the rheological agents are added in an amount ranging from about 0.5-2% by weight.

Though, as indicated above, the thixotropic ceramic material may be prepared in a wide variety of formulations, a particular composition has been determined to be eminently suitable which comprises alumina in an amount ranging from about 40-80%, and preferably from about 45-50%, chromia in an amount ranging up to about 20%, and preferably from about 10-15%, kaolin in an amount ranging up to about 10%, and preferably from about 2-5%, bentonite in an amount ranging from about 0.1-10%, and preferably from about 0.5-2%, colloidal aluminum orthophosphate (50% solution) in an amount of from about 5-50%, and preferably from about 25-35%. Additional water may be added to the above formulation in amounts ranging up to about 20%, and preferably from about 5-10% for the purpose of adjusting viscosity, discussed in detail hereinbelow. Though the foregoing formulation is suggested in its preferred ranges, it is to be understood that the invention is not limited thereto, as other formulations may be prepared from the ingredients recited earlier In addition to its thixotropic properties, the ceramic slurry of the present invention must possess a carefully controlled viscosity during the time of impregnation, in order to enable the achievement of a reproducibly uniform ceramic article. The desired range of viscosity has been found to be from $1 \times 10^3$ to $80 \times 10^3$ cps (centipoise), and preferably within the range of $10 \times 10^3$ to $40 \times 10^3$ cps. Viscosity is regulated during the formulation of the slurry and must be within the above ranges at the time the organic polymer foam is imprengated. As noted above, a convenient way of regulating and thereby controlling viscosity is through the variation in excess water content within the specified ranges. For the purposes of the present invention, viscosity is measured at 25° C with a #6 spindle, Brookfield RVT Viscometer at 20 rpm after 15 minutes rotation, the slurry having previously been mixed in an 80-quart Hobart Mixer at 60 rpm for 30 minutes.

Referring to FIG. 1 of the drawings, slabs 1 of reticulated polyurethane foam having pore sizes between 5 and 50 ppi, preferably between 25 and 35 ppi, and desired size, such as any convenient length, a width of 4 to 36 inches, and thickness of ¼ to 4 inches, for example, 17 inches wide and 2 inches thick, are passed successively through a ½ inch gap between rolls 2 and 3 and then through the closely adjacent gap of 3/16 to ⅜ inch between rolls 2 and 4. The rolls have a grit surface, may be of convenient size, such as 3 inches in diameter and somewhat longer than the slab width, and are mounted in a housing at each end, supported in base 5, the shaft ends being geared together to rotate at the same speed, for example at 12.5 rpm. The leading edge of the slab may be immersed in the slurry before entering the first roll gap, and during the passage through the roll stand, slurry 6 is caused to flow from container 7 over the surface of roll 2 and slab 1 at a rate such as to maintain a pool or supply 8 of slurry at the gap entrance. On leaving the first gap, slab 1 quickly tends to recover its original thickness because of its resilience, and then is immediately compressed while traversing the second gap, following which it recovers its original thickness, and is discharged to conveyor 9. The series of alternate compressions and recoveries of the slab serve to maintain the slurry in fluid condition and thus facilitate the uniform distribution of slurry in the slab. Subsequently, the retained slurry is in a quiescent state and its viscosity undergoes a rapid rise because of its thixotropic properties, being held firmly within the slab during handling and while being dried. The foregoing sequence may be repeated once or twice to insure the desired uniformity in the distribution of slurry retained in the slab, preferably after turning the slab 180° end over end. Alternatively, the impregnated slab emerging from the roll stand may be passed through one or more similarly arranged roll stands. A drip 10 is provided below the roll stand to collect excess slurry and drippings from the slab edges and the rolls, which may be returned steadily or intermittently to the main slurry reservoir, not shown, where it is maintained fluid and ready for use by adequate stirring or vibration.

Among variations in the apparatus as described above which may be advantageous at times, rolls 2 and 3 may be mounted side by side with their shaft centers in the same substantially horizontal plane, so that a pool of slurry is maintained in contact with both main surfaces of the slab at the gap entrance, with roll 4 retained in position below the outer two rolls and approximately half way between them, so that the slab is not unduly distorted during its passage between the gaps.

Figure 2:
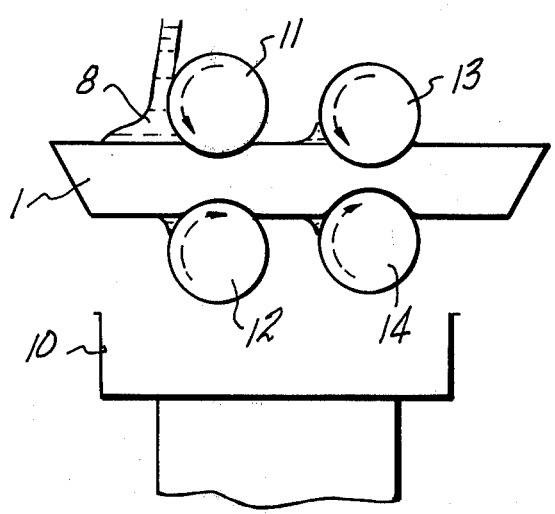
FIG. 2 shows in schematic form a modification wherein the roll assembly shown in FIG. 1 is replaced by two double roll assemblies for providing the compression and recovery stages.

The embodiment shown in FIG. 2 provides a pair of two-high roll stands which may be used to replace the triple roll stand in the apparatus assembly shown in FIG. 1. The first and second gaps are provided, respectively, between rolls 11 and 12 of the first stand and between rolls 13 and 14 of the second stand, functioning in the same manner as described above with respect to the embodiment of FIG. 1.

The uniformly impregnated slabs are transferred from conveyor 9 and may then be dried and, if desired, fired to provide a fused ceramic foam article. The drying and heating sequence is employed for the primary purpose of removing water and then the organic polymer foam from the article. Generally, conventional drying techniques may be employed, but it should be kept in mind that a suitable heating rate for the removal of the foam should take into account the heat provided by the oxidation of the foam itself. The effect of this phenomenon is particularly noticeable in the heating of large masses of the foam where a significant volume of the heating chamber may be occupied by the articles. In such cases, it may be necessary to maintain the material at a temperature ranging from 400°–700° F to avoid excessive heat up resulting from chemical reaction which may cause the ceramic filaments to rupture under thermal stress. The exact temperature will be dictated by the particular organic foam base used.

As indicated above, the ceramic foam may, if desired, be further heat treated or fired to fuse the ceramic particles into a highly refractory structure. As noted earlier, this practice is optional, as, for example, in the employment of the foam articles of the present invention as filters for molten aluminum, it has been found that the foam material need only be heat treated at a temperature of from 1,000° to 1,100° F to remove the organic component. The resulting article would be suitable as such for use with molten aluminum alloy at temperatures as high as 1,400° F. In such use, the air setting or binding agent would provide the necessary strength to the article, and the full sintering treatment would not be required.

Utilizing the method disclosed above, ceramic foams may be prepared which range in thickness from $\frac{1}{4}$ to 4 inches and may be of an area ranging up to about several square feet. The foams would possess, based on the raw foam employed, pore counts of from about 5 to 50 ppi, with permeabilities ranging from about $100 \times 10^{-7}$ $cm^2$ to $10,000 \times 10^{-7}$ $cm^2$ and bulk densities of from 0.2 $gm/cm^3$ to 1 $gm/cm^3$.

In the instance where the foam articles of the present invention are utilized as filters for molten metal, air permeabilities may range from about 400 to $8,000 \times 10^{-7}$ $cm^2$ and pore counts may range from about 5 to 45 ppi. Naturally, as noted earlier, both permeabilities and pore sizes may be varied to suit the particular mode of end use of the article. Thus, for example, a relatively fine filter may be prepared which would possess an air permeability of from 400 to $2,500 \times 10^{-7}$ $cm^2$ and a pore count of from 20 to 45 ppi. Such an article would be useful in the filtration of aluminum alloys of the 5,000 series. However, if the input metal is particularly dirty, one should preliminarily filter the metal through a relatively coarse ceramic foam filter having a pore size of between 5 and 20 ppi, and an air permeability ranging from 2,500 to $8,000 \times 10^{-7}$ $cm^2$. This may be accomplished by providing a single filter with a gradation of properties or by using a series of filters of differing porosity.

In accordance with the present invention, the advantages and features of the above method will be more readily understandable from a consideration of the following comparative examples, Example I being representative of the process of copending application Ser. No. 589,294 filed June 23, 1975 and Example II in accordance with the present invention.

EXAMPLE I

A polyester polyurethane foam material was provided having a thickness of 2 inches, containing 30 pores per linear inch and having an air permeability of $4,697 \times 10^{-7}$ $cm^2$. An aqueous ceramic slurry containing 47% alumina, 13% chromia, 3.5% kaolin, 1% bentonite, and 29% aluminum orthophosphate (50% aqueous solution) was mixed in an 80-quart Hobart mixer at 60 rpm for 1 hour. After $\frac{1}{2}$ hour of mixing a sample was removed for viscosity testing. The sample showed that the slurry had a viscosity of $32.0 \times 10^3$ cps at 25° C measured with a #6 spindle, Brookfield RVT Viscometer at 20 rpm after 15 minutes testing. A slab of the foam material was immersed in the slurry and repeatedly compressed and expanded with a plunger device for about 30 seconds while the bath of slurry was vibrated at 60 cycles per second in order to fill the voids with slurry. The polymeric foam slab thus impregnated was taken from the slurry and passed through grit-coated rolls in a triple roll stand preset to provide 75% and 87.5% reductions in thickness to expel the excess slurry. The rolls were of 3 inch diameter and were driven at a speed of 12.5 rpm. The article exhibited substantially complete spring-back after rolling was completed.

The slab was then dried in an oven at 150° F for 1 hour and at 200° F for 2 hours, and was then heated from 200° F to 500° F/hr., and held at 500° F for 8 hours, in order to remove the polyurethane fibers without collapsing the ceramic web. The resulting material was then fired in a kiln using a heating rate of 170° F/hr. to 1,800° F, followed by a furnace cool.

The fired slab proved to be sound and the surface was resistant to spalling. Its permeability was measured as $1554 \times 10^{-7}$ $cm^2$ and its bulk density as 0.39 $gm/cm^3$, and the product displayed an average modulus of rupture of 18.3 psi.

EXAMPLE II

This example employed slabs of the same lot of polyester polyurethane material and a slurry, having viscosity measured as $30.5 \times 10^3$ cps, of the same composition as used in Example I, which were treated in accordance with th combined impregnation-rolling method of this invention, as shown in FIG. 1, using a triple roll stand of 3 inch diameter rolls rotated at 12.5 rpm. The polymeric foam slab was advanced into the first roll gap, preset to provide a 75% reduction in thickness, through a supply of slurry flowing thereto at a rate as to maintain a pool of slurry, contacting the slab and roll surfaces at the gap entrance. As the slab advanced beyond the gap, it recovered in thickness and then immediately entered the second gap, preset to accomplish an 87.5% reduction in thickness before recovery to the original thickness. The emerged slab was then turned end over end through 180° and the above impregnation rolling process was repeated, using the above procedure, resulting in a uniformly impregnated slab which exhibited complete recovery of the original thickness and the retention of greater resilience throughout the process than was evident in Example I. The slabs were then dried and heated as set forth in Example I, the product being sound and having a surface resistant to spalling. The permeability was measured as $1456 \times 10^{-7}$ cm$^2$, the bulk density as 0.38 gm/cm$^3$, and average modulus of rupture as 21.1 psi.

Thus, the method of this example eliminates procedural steps essential in the previous method and results in a product of improved strength properties. This result is probably accomplished because of the decreased distortion effects, internal abrasion of polymeric filaments and webs, and/or structural deterioration which may otherwise occur during the excessive handling steps previously considered necessary.

Furthermore it is apparent that the procedural steps embodied in Example I are not well adapted for automation, as would be desired for operation by mass production methods. In contrast, the component operating steps embodied in Example II may readily be automated, including the advancement of individual polymeric foam slabs, photoelectric control of the flow of slurry to contact the roll and slab surface just prior to the rolling steps, and transfer of the impregnated slabs to the drying and heating zone. It may be noted that the above applies likewise to the combined impregnation and rolling of continuous lengths of polymeric foam, which may be subdivide to final form when convenient, such as after the drying and heating treatment. Particularly for such use, it may be advantageous to provide that the lowermost roll or rolls be partly immersed in the slurry contained in the dip tank to insure the presence of excess slurry for contact with the lower surface of the polymeric foam during the impregnation-rolling operation.

In summary, the preferred embodiments in accordance with this invention comprise the use of organic polymeric foam material as above described, characterized by having 25 to 35 ppi (pores per inch), permeability of 4000 to 8000 $\times 10^{-7}$ cm$^2$, and thickness of about 2 to 4 inches; the use of aqueous suspensions of finely-divided refractory composition as specified above, having a viscosity of 25 to 35 $\times 10^3$ cps; the production of ceramic foam product having a permeability of 1,000 to 3,000 $\times 10^{-7}$ cm$^2$; and subjecting the polymeric foam immediately after its initial contact with the slurry to multiple cycles of temporary compression and recovery by pasage through adjacent roll gaps, the first compression amounting to 50% to 80% and subsequent compressions being the same as the first or greater, up to a maximum of about 90%.

Unless otherwise specified, all percentages expressed herein are in terms of percent by weight.

This invention may be embodied in other forms or carried out in other ways without departing from the spirit or essential characteristics thereof. The present embodiments are therefore to be considered as in all respects illustrative and not restrictive, the scope of the invention being indicated by the appended claims, and all changes which come within the meaning and range of equivalency are intended to be embraced therein.

What is claimed is:

1. A method of preparing a ceramic foam possessing controlled permeability and structural uniformity which comprises:
   A. providing a hydrophobic, reticulated organic polymer foam possessing a predetermined permeability and resilience;
   B. preparing an aqueous slurry of a thixotropic ceramic composition having a viscosity within the range of $1 \times 10^3$ to $80 \times 10^3$ cps;
   C. providing at least three rolls mounted to furnish at least two gaps in close proximity between pairs of said rolls, the first gap being preset at a spacing of 50–90% of the thickness of said polymer foam and the second gap at 70–90% of said thickness;
   D. passing said polymer foam through said roll gaps while flowing said slurry over at least one roll and a surface of said polymer foam to establish a supply of said slurry at the entrance to said first gap, thereby uniformly impregnating said polymer foam with said slurry; and
   E. drying and heating said impregnated foam to remove the organic component therefrom.

2. The method of claim 1 wherein said roll gaps are provided by a triple-roll stand.

3. The method of claim 1 wherein said roll gaps are provided by a pair of two-roll stands.

4. The method of claim 1 wherein the said first roll gap is preset at a spacing equal to 50% to 90% of the thickness of said polymer foam.

5. The method of claim 1 wherein the said second gap is preset at a spacing equal to 70% to 90% of the thickness of said polymer foam.

6. The method of claim 1 wherein the said polymer foam has a thickness of 0.25 inch to 4 inches.

7. The method of claim 1 wherein the said polymer foam is selected from the group consisting of polyester polyurethanes, polyether polyurethanes, polyvinyl foam materials, and cellulosic derivatives.

8. The method of claim 1 wherein the said polymeric foam has a resilience measured by the ball rebound test of greater than 25%, a compression set not greater than 30% at 50% compression, a permeability of 4000 to 8000 $\times 10^{-7}$ cm$^2$ and a pore size of 5 to 50 ppi.

9. The method of claim 1 wherein said aqueous slurry contains a ceramic composition comprising materials selected from the group consisting of alumina, chromia, zirconia, magnesia, titania, silica, mullite, calcined clay, and mixtures thereof.

10. The method of claim 9 wherein said composition further comprises 2.5 to 25% of an air setting agent and 0.1 to 12% of a rheological agent.

11. The method of claim 10 wherein said air setting agent is selected from the group consisting of colloidal aluminum orthophosphate, alkali metal silicates, ethyl silicate, aluminum hydroxychloride, magnesium orthoborate and mixtures thereof.

12. The method of claim 10 wherein said rheological agent is selected from the group consisting of organic cellulosic derivatives, bentonite, kaolin and mixtures thereof.

13. The method of claim 9 wherein said slurry comprises 40–80% alumina, up to 20% chromia, 2.5 to 25% aluminum orthophosphate, up to about 10% kaolin and about 0.1–10% bentonite.

14. The method of claim 13 wherein said slurry comprises 45–50% alumina, 10–15% chromia, 12.5–17.5% aluminum orthophosphate, 2–5% kaolin, and 0.5–2% bentonite.

15. The method of claim 1 wherein the viscosity of said slurry is $10 \times 10^3$ to $40 \times 10^3$ cps.

16. The method of claim 1 wherein said drying is conducted at a temperature ranging from about 400°–700° F.

17. The method of claim 16 wherein said foam material is further heated to sinter said ceramic composition entrained therein.

18. The method of claim 1 wherein the said polymer foam has a permeability of 4000 to $8000 \times 10^{-7}$ cm$^2$, the said aqueous slurry has a viscosity of 25 to 35 cps, the said first roll gap being preset at a spacing of 50 to 80% of the thickness of the said polymer foam, and the said second gap being preset at a spacing at least the same as the first and up to 90% of the thickness of the said polymer foam.

19. In preparing a ceramic foam having controlled permeability and structural uniformity, the method comprising:
   A. providing a hydrophobic, reticulated organic polymer foam having a predetermined permeability and resilience;
   B. preparing an aqueous slurry of a thixotropic ceramic composition having a viscosity of $1 \times 10^3$ to $80 \times 10^3$ cps;
   C. providing at least three rolls mounted to furnish at least two gaps in close proximity between pairs of said rolls, the first gap being preset at a spacing of 50 to 90% of the thickness of said polymer foam and the second gap at 70 to 90% of the said thickness; and
   D. advancing said polymer foam through said roll gaps while flowing said slurry over at least one surface of said polymer foam and into said first roll gap, thereby uniformly impregnating said polymer foam with said slurry.

20. The method of claim 19 wherein said polymer foam is advanced a plurality of times through the said roll gaps.

* * * * *